Figure 1:
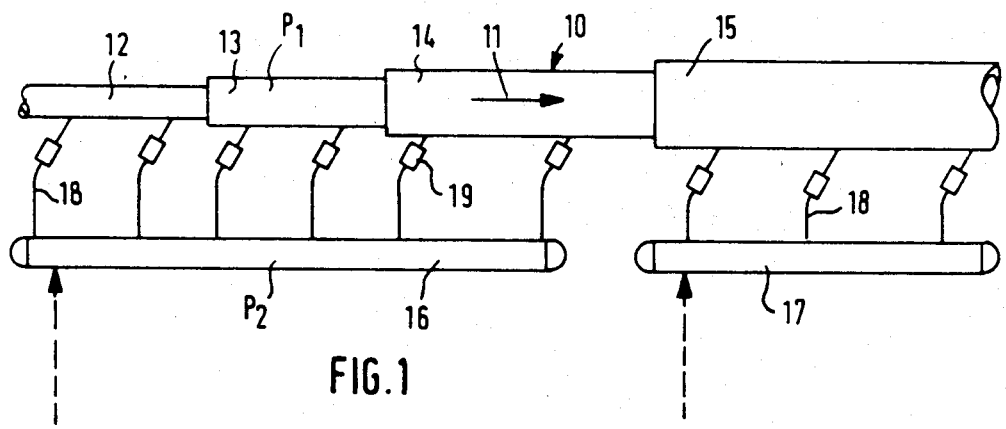

United States Patent [19]

Stelter et al.

[11] Patent Number: 4,491,442
[45] Date of Patent: Jan. 1, 1985

[54] METHOD AND DEVICE FOR PNEUMATIC FEEDING OF MATERIALS

[75] Inventors: Jürgen Stelter, Grenzach-Wyhlen; Manfred Hänggi, Rheinfelden, both of Fed. Rep. of Germany

[73] Assignee: Dürr Automation + Fördertechnik GmbH, Fed. Rep. of Germany

[21] Appl. No.: 348,058
[22] PCT Filed: Nov. 9, 1981
[86] PCT No.: PCT/DE81/00098
 § 371 Date: Feb. 11, 1982
 § 102(e) Date: Feb. 11, 1982
[87] PCT Pub. No.: WO82/00132
 PCT Pub. Date: Jan. 21, 1982

[30] Foreign Application Priority Data

Jun. 28, 1980 [DE] Fed. Rep. of Germany ....... 3024568

[51] Int. Cl.³ .................................................. B65G 53/16
[52] U.S. Cl. ...................................... 406/95; 406/195
[58] Field of Search ............................ 406/93–95, 406/195

[56] References Cited

U.S. PATENT DOCUMENTS

| 2,874,999 | 2/1959 | Löfgren | 406/95 |
| 2,897,005 | 7/1959 | Wiltse | 406/95 |
| 3,206,255 | 9/1965 | Gray | 406/93 |
| 3,413,038 | 11/1968 | Frazier | 406/95 X |
| 3,537,755 | 11/1970 | Schmidt | 406/95 |
| 3,591,238 | 7/1971 | Titus | 406/195 |
| 3,837,540 | 9/1974 | Wagener | 406/94 X |
| 3,876,259 | 4/1975 | Gunderson | 406/93 |
| 4,025,121 | 5/1977 | Kleysteuber et al. | 406/94 X |

FOREIGN PATENT DOCUMENTS

| 449393 | 9/1927 | Fed. Rep. of Germany. |
| 584852 | 9/1933 | Fed. Rep. of Germany ........ 406/95 |
| 1121544 | 1/1962 | Fed. Rep. of Germany. |
| 1128808 | 4/1962 | Fed. Rep. of Germany. |
| 1781025 | 8/1972 | Fed. Rep. of Germany. |
| 2216201 | 12/1974 | France. |
| 2339554 | 1/1977 | France. |
| 2374238 | 12/1977 | France. |
| 1066152 | 4/1967 | United Kingdom. |

Primary Examiner—Jeffrey V. Nase
Assistant Examiner—L. E. Williams
Attorney, Agent, or Firm—Kenway & Jenney

[57] ABSTRACT

Method and device for pneumatic feeding of materials to be conveyed along a feeding line (10) supplied continually with conveying gas from conveying gas lines (18) discharging into the feeding line and spaced consecutively apart from each other. Each gas line (18) has at a distance from its opening (28) a short cross-sectional constriction (20), in the area of which the velocity of the conveying gas is increased to the velocity of sound and decreased again before the opening (28). A plurality of gas lines (18) are fed from a common supply line (16, 17) which runs adjacent to the feeding line (10). The gas lines (18) open into the feeding line (10) at an acute angle of approx. 35° and have two sections (21, 23) detachably connected with each other by a sealing screw connection (24), an apertured diaphragm, forming the cross-sectional constriction (20), and a filter (22) being held interchangeably by the screw connection.

18 Claims, 4 Drawing Figures

METHOD AND DEVICE FOR PNEUMATIC FEEDING OF MATERIALS

The invention relates to a method and device for pneumatic feeding of powdery and/or granulated bulk materials, of heavy flowing and/or sticky, of abrasive, sensitive and/or moist materials in a tubular feeding line by means of a device, the feeding line of which is supplied with carrier gas along its length from a plurality of gas lines discharging into the feeding line and spaced consecutively apart from each other. It is therefore intended to provide a very advantageous, so-called seal flow feeding in respect of feeding capacity and economic efficiency (comparably lower energy requirements) in comparison with other pneumatic feeding methods.

A method of this type is known, for example, from DE-PS No. 26 57 677. This known method does, however, have the disadvantage that the carrier gas from the pressure gas source, which supplies the gas lines discharging into the feeding line, will, when a plug forms in the feeding line, flow into the feeding line essentially through that gas line which offers least resistance. This leads to an uneven supply of gas into the feeding line and there is also no chance of the plug in the feeding line being dissolved.

In the case of another known feeding device (DE-PS No. 449 393) having a gas supply line adjacent to the feeding line valves are disposed in the gas lines running from the gas supply line to the feeding line, these valves automatically opening and closing again to eliminate any plugs formed in the feeding line, i.e. with this known feeding device the gas lines discharging into the feeding line are normally closed. The disadvantage of this known feeding device is therefore not only that it does not work in accordance with the seal flow supply method mentioned but that the pressure-responsive controllable valves in the gas lines require considerable resources and are also a source of possible interruptions.

The object of the present invention was therefore to develop a method of the type mentioned at the beginning such that even if plugs are formed in the feeding line selected amounts of gas may reach the feeding line through the individual gas lines and that plugs can be dissolved.

This object may be solved according to the invention in that the velocity of the gas in each of the gas lines is increased to the velocity of sound at a point before the opening into the feeding line and likewise decreased again before the opening. By generating the velocity of sound at a point in each of the gas lines the amount of gas flowing through each gas line per unit of time will be independent of the pressure ratio in the feeding line; decreasing the velocity of the gas before the opening into the feeding line prevents the wall of the feeding line in the area where the gas lines open into it being subjected to intense erosive abrasion. The method according to the invention may be carried out by a particularly simple device; based on a feeding device having a tubular feeding line, into which a plurality of gas lines open, these being spaced consecutively apart from each other and fed from at least one pressure gas source, such a device is designed according to the invention such that each gas line has at a distance from its opening into the feeding line a cross-sectional constriction, the through-flow cross section widening again between this constriction and this opening, and that the pressure of the gas before the cross-sectional constriction is in overcritical ratio to the pressure in the feeding line. According to the invention no movable parts are required in the gas lines, in contrast to the known feeding device according to DE-PS No. 449 393, and the cross-sectional constriction may have the form of a simple apertured diaphragm.

In the case of pneumatic feeding devices having a plurality of feeding lines fed by one common compressed air source it is already known (DE-PS No. 1 121 544) to have one single gas line leading from the compressed air source to each feeding line and to have a nozzle disposed in this line for generating the velocity of sound. With the known construction generation of the velocity of sound therefore serves a completely different purpose in comparison with the feeding method according to the invention, with which it is a question of effecting an even supply of gas along an entire feeding line in order to achieve a seal flow feeding.

It is advantageous to have the cross-sectional constriction formed by a dosaging device, i.e. a dosaging device is disposed in each of the gas lines and is designed such that velocity of sound is generated at an over-critical pressure ratio, the velocity of the gas again being reduced farther along the gas line and before it opens into the feeding line.

The invention therefore ensures that the amount of gas flowing through each individual gas line is always exactly defined. Even if a plug forms in the feeding line, when the method according to the invention is carried out gas still flows through all the gas lines into the feeding line, also through those gas lines which are in the area of the plug. The plug will thereby be dissolved again and feeding can be satisfactorily maintained.

Since the invention, for the first time, permits the amount of gas supplied to the feeding line through the individual gas lines to be exactly predetermined the invention also enables the known drop in pressure per section of feeding line to be taken into account and an even conveying speed to be ensured despite the supply of carrier gas along the feeding line: According to the invention the feeding line is designed such that its cross section widens in the direction of feeding in a predetermined manner.

In view of the even, shock-free and, if necessary, slow seal flow feeding achieved according to the invention the abrasion on the walls of the feeding line and the material to be conveyed is reduced to a minimum. An additional advantage achieved by the invention is to be seen in the minimizing of the amounts of carrier gas which saves on energy and costs.

When compressed air is used as carrier gas the ratio of the pressure before the cross-sectional constriction to the pressure in the feeding line is preferably at least 2:1; a larger pressure ratio may, of course, be selected. Insofar as other gases (e.g. argon) are used as carrier gas a different minimum value for the over-critical pressure ratio will of course apply—corresponding to the gas constants deviating from air.

The velocity of sound of the carrier gas aimed at in the gas lines is in any case ensured by the over-critical pressure ratio. The dosaging device, which may be, for example, a nozzle, an apertured diaphragm, a calibrated needle valve or the like, contributes substantially to the generation and maintenance of the velocity of sound in the gas lines. A calibrated needle valve as dosaging device has the advantage that the amount of gas to be supplied may be varied within specified limits.

Figure 3:
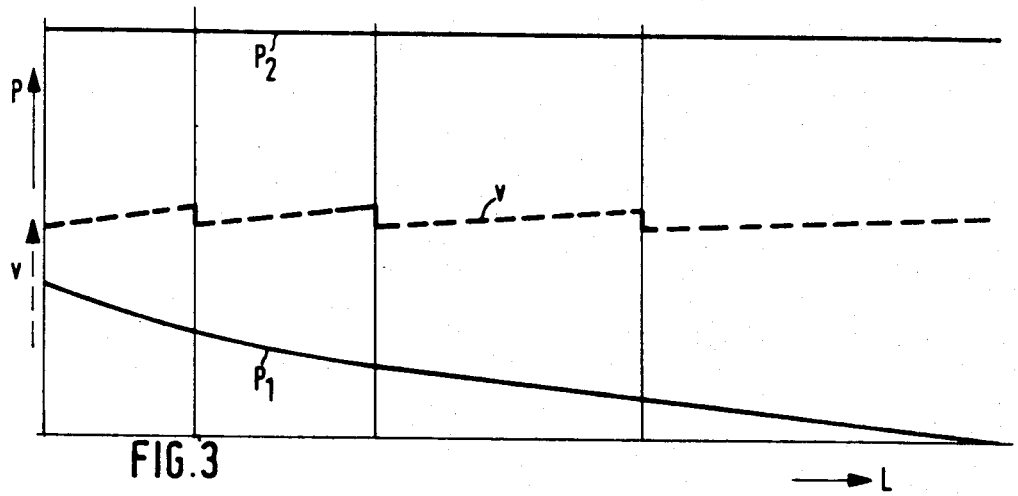
Figure 4:
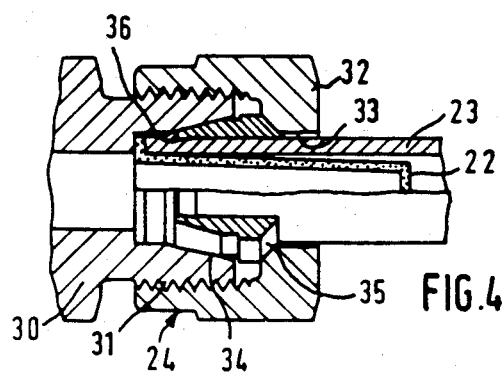
Figure 2:
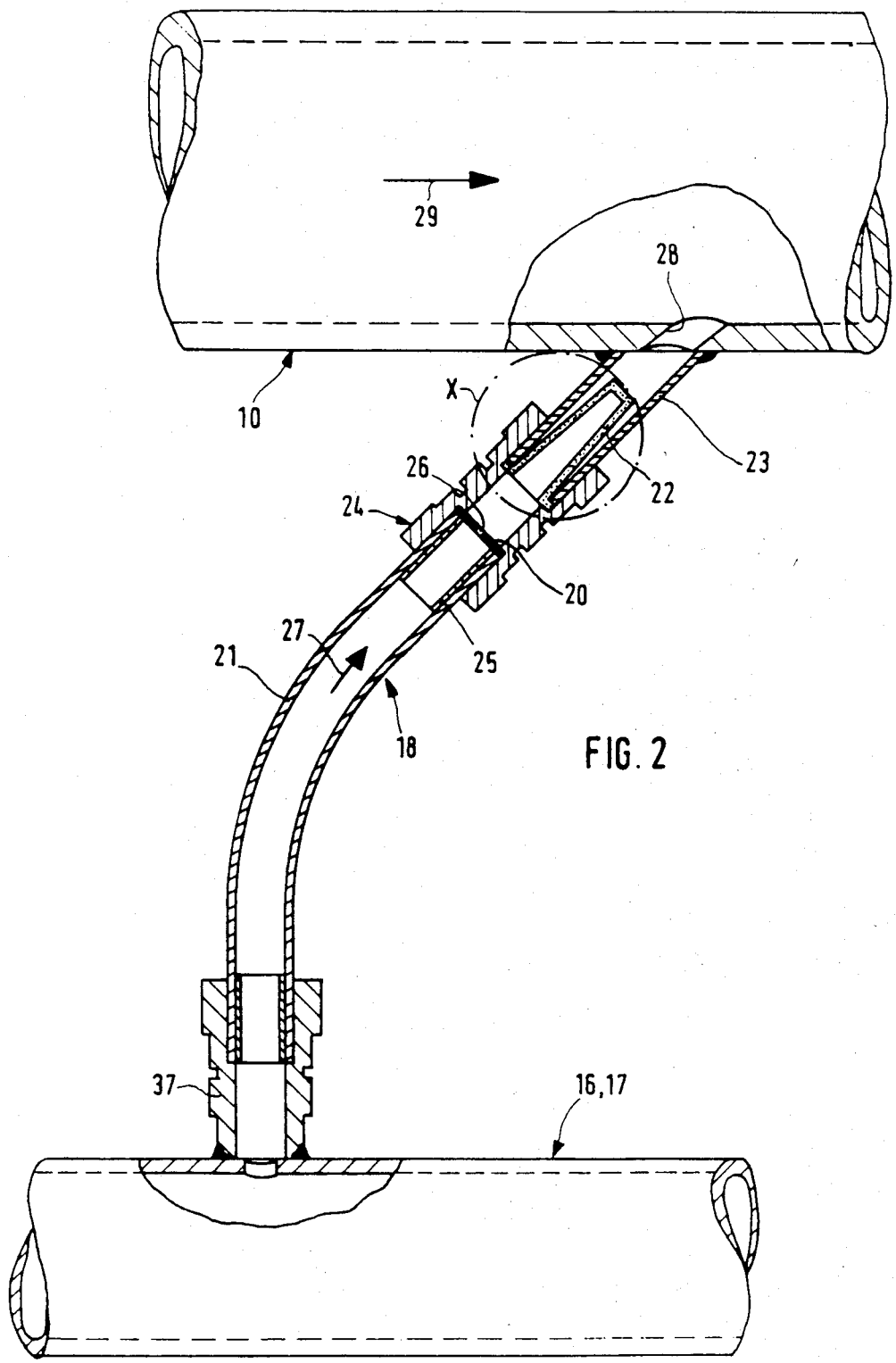

Additional features, advantages and details of the invention are given in the attached claims and/or the following specification and the attached drawings of a preferred embodiment of a pneumatic feeding device according to the invention; the drawings show:

FIG. 1 a schematic illustration of the pneumatic feeding device;

FIG. 2 a section of the pneumatic feeding device, partially in sectional view;

FIG. 3 a schematic diagrammatic illustration of the pressure and velocity conditions within the feeding device according to FIG. 1 and FIG. 4 an enlarged sectional view of the detail marked "X" in FIG. 2.

FIG. 1 shows a feeding line 10 comprising a plurality of partial sections 12 to 15, the diameter of which enlarges step by step in the direction of feeding 11, for the pneumatic seal flow feeding of bulk goods or powdery materials, heavy flowing masses, slurries or the like. With a view to the material to be conveyed the feeding line 10 is supplied by a feeding transmitter (not shown), into which the material to be conveyed is fed in batches. A defined product feeding can thereby take place either due to the difference in pressure between feeding line and feeding transmitter or due to a mechanical dosaging system, such as a screw conveyor or charging valve or by a blow dosaging slide. Two high pressure by-pass storages 16 and 17 are disposed parallel to the tubular feeding line 10. The high pressure by-pass storages 16, 17 are designed with a large volume and are supplied with pressure gas (e.g. compressed air) from a pressure gas source (not shown) which may also serve to admit pressure gas into the feeding transmitter, or is independent thereof, via a pressure reducing device (not shown). The high pressure by-pass storages 16 and 17 serve to supply carrier gas to the feeding line 10. For this purpose a plurality of individual gas lines 18 issue from each of the high pressure by-pass storages 16, 17, these gas lines opening into the feeding line 10 at an angle of about 35° (cf. FIG. 2). The device described is designed such that when compressed air is used the pressure prevailing in the high pressure by-pass storages 16, 17 is higher than that in the feeding line 10 by at least the factor of 2. This is a so-called over-critical pressure ratio which causes velocity of sound to be generated in the gas lines 18. For this purpose a dosaging device 19 is disposed in each individual gas line 18. In the embodiment according to FIG. 2 an apertured diaphragm 20 serves as dosaging device, this apertured diaphragm being disposed at the end of a first section 21 of the gas line. The apertured diaphragm 20 which is supported in the rearward direction by a reinforcement sleeve 25, has a narrow opening 26, the amount of gas flowing through being exactly defined by its cross-sectional area. The second value for exact definition of the amount of gas flowing through the dosaging device is the velocity of the gas. Since, as already mentioned above, an over-critical pressure ratio $P_2/P_1$ prevails between the by-pass system 16, 17 and the feeding line 10 (cf. also FIG. 3) the velocity of the gas in the apertured diaphragm is constant, i.e. equal to the velocity of sound.

The sum of all the diaphragm cross sections, multiplied by the defined air or gas velocity (velocity of sound) results in the total amount of carrier air in the gas lines 18. The amount of air in the gas lines 18 plus the amount of air in the pneumatic feeding transmitter (not shown) for the feeding line 10 results in the total air consumption.

Other dosaging devices, such as e.g. nozzles, calibrated needle valves or the like, may be used instead of the apertured diaphragm 20, 26 shown.

A filter 22 is connected to the outlet side of the apertured diaphragm in the feeding direction 27 of the gas in order to prevent any material being conveyed penetrating into the gas line 18. The filter 22 is provided in a second section 23 of the gas line. This has a considerably wider cross section than the opening 26 of the apertured diaphragm so that the velocity of the gas at inlet 28 is again greatly reduced. This will avoid abrasive wear on the inner walls of feeding line 10 as well as within the goods to be conveyed. The almost tangential gas feeding in respect of the direction of feeding 29 within the feeding line also contributes substantially towards minimizing abrasion, as shown clearly in FIG. 2 (gas blow angle 35°).

The two line sections 21, 23 are connected with each other via a sealing screw connection 24, the construction of which is illustrated in detail in FIG. 4 and which serves at the same time to fix the apertured diaphragm 20 on the one hand and the filter 22 on the other. According to FIG. 4 the screw connection 24 consists of a thread portion 30 with external thread 31, onto which a screw cap 32 is screwed. The screw cap 32 has a central bore 33 which is penetrated by the portion 23 of the gas line. A cutting ring 35 is clamped between a conical bore 34 of the thread portion 30 and the end of the portion 23 of the gas line extending into this bore. The cutting edge 36 of this cutting ring cuts into the material of the portion 23 of the gas line under the radial and axial pressure exerted by the screw cap and in this way provides a sealing connection between the portions 23, 30. The sealing connection between the other portion 21 of gas line 18 and the thread portion 30 is achieved in a similar way and also the connection of the gas line 18 to the high pressure by-pass storage 16, 17. Here, too, a corresponding screw connection is provided; this is shown in FIG. 2 under reference numeral 37.

The diagram according to FIG. 3 shows that the feeding speed in the individual sections 12 to 15 of the feeding line 10 remains essentially constant due to the widening of their cross sections whereas pressure $P_1$ steadily decreases along the feeding length L. Curve $P_2$ characterizes the pressure in the high pressure by-pass storages 16 and 17. The high pressure by-pass storage or storages 16 or 17 ensure a defined supply of gas over the entire length of the feeding line. The feeding of materials is kept constant at each point along the feeding line system due to uniform pressure ratios.

The pneumatic feeding shown and described may be used for customary powdery and granulated products with the advantage of low energy requirements as well as slight wear. A further possible application is in the feeding of difficult, abrasive, sticky, moist and sensitive products. The feeding of such products was partially impossible with previous pneumatic feeding systems. The system may also be used for feeding coal in, for example, carbon pressure gasification plant.

We claim:

1. Method for pneumatic feeding of materials to be conveyed along a tubular feeding line supplied with conveying gas at least substantially continually from at least one source of pressure gas via a plurality of gas lines discharging into the feeding line and spaced consecutively apart from each other, comprising increasing the velocity of the conveying gas in each of the gas lines (18) to the velocity of sound at a point (20) before the opening (28) whereby the amount of gas per unit of time flowing through said gas lines is independent of the pressure in said feeding line.

2. Device for carrying out the method according to claim 1, comprising a tubular feeding line, into which a plurality of gas lines open, said gas lines being spaced consecutively apart from each other and fed from at least one pressure gas source, characterized in that each gas line (18) has at a distance from its opening (28) into the feeding line (10) a cross-sectional constriction (20), the throughflow cross-section of which being smaller than the through flow cross-section of the gas line downstream of said constriction, and that the pressure of the gas before the cross-sectional constriction is in overcritical ratio to the pressure in the feeding line.

3. Device according to claim 2, characterized in that the cross-sectional constriction (20) is formed by a dosaging device (19).

4. Device according to claim 2 or 3, characterized in that when air is used as carrier gas the ratio of the pressure before the cross-sectional constriction (20) to the pressure in the feeding line is at least 2:1.

5. Device according to claim 2, characterized in that the cross-sectional constriction is designed as a nozzle.

6. Device according to claim 2, characterized in that the cross-sectional constriction is designed as an apertured diaphragm (20).

7. Device according to claim 2, characterized in that the cross-sectional constriction is formed by a dosaging device (19) having an adjustably variable throughflow passage.

8. Device according to claim 7, characterized in that the dosaging device is designed as a, in particular, calibrated needle valve.

9. Device according to claim 2, characterized in that a carrier gas supply line (16, 17) runs adjacent to the feeding line, the gas lines (18) branching off from said supply line.

10. Device according to claim 2, characterized in that the individual gas lines (18) each have a first line section (21) with a dosaging device (20) disposed at its end and forming the cross-sectional constriction as well as a second line section (23) with a filter (22) disposed at its beginning and that the two line sections are detachably connected with each other by a sealing screw connection (24).

11. Device according to claim 10, characterized in that the sealing screw connection (24) serves to fix both the dosaging device (20) and the filter (22).

12. Device according to claim 2, characterized in that the pressure gas source (16, 17) is designed as a high pressure storage with a large storage volume in comparison with the total volume of all the individual gas lines (18).

13. Device according to claim 2, comprising a pneumatic feeding transmitter for the material to be conveyed along the feeding line, characterized in that the feeding transmitter on the one hand and the pressure gas source (16, 17) for the gas lines (18) on the other are connected to separate primary pressure-gas sources.

14. Device according to claim 2, characterized in that the feeding transmitter and the pressure-gas source (16, 17) for the gas lines (18) are connected to a common primary pressure-gas source, two branch lines issuing from said source, the one branch line leading directly to the pressure-gas source (16, 17) for the gas lines (18) and the second branch line leading via a pressure reduction device to the feeding transmitter.

15. Device according to claim 2, characterized in that the gas lines (18) open into the feeding line (10) at an acute angle, preferably an angle of approximately 35 degrees, to the direction of feed (29).

16. Device according to claim 2, characterized in that the gas lines (18) open into the feeding line (10) in a turbulence blower having a plurality of blow apertures distributed over the circumference of the feeding line.

17. Device according to claim 2, characterized in that the cross section of the feeding line (10) widens in the direction of feed.

18. Device according to claim 17, characterized in that the cross section of the feeding line (10) widens in stages at or between the openings (28) of the gas lines (18).

* * * * *